United States Patent [19]
McCanse

[11] 3,757,596
[45] Sept. 11, 1973

[54] MOTION TRANSMITTING STRUCTURE
[75] Inventor: James E. McCanse, Oregon, Ill.
[73] Assignee: Hesston Corporation, Hesston, Kans.
[22] Filed: Feb. 18, 1972
[21] Appl. No.: 227,468

[52] U.S. Cl. .................................................. 74/491
[51] Int. Cl. ............................................. G05g 7/00
[58] Field of Search .......................... 74/491, 96, 89; 56/DIG. 22

[56] References Cited
UNITED STATES PATENTS
2,490,624  12/1949  Forwald .................................. 74/96

Primary Examiner—Milton Kaufman
Attorney—Schmidt, Johnson, Hovey & Williams

[57] ABSTRACT

A tractor implement employs a torque rod having an angularly offset projection, a swingable, adjusting lever provided with a tube slidably receiving the projection, and a crank pin on the rod engageable with and supported by a hitch assembly interconnecting the implement with the tractor for translating the swinging motion of the lever into an upward or downward movement of one end of the implement.

10 Claims, 7 Drawing Figures

MOTION TRANSMITTING STRUCTURE

This is a division, of application Ser. No. 149,556, filed June 3, 1971.

This invention relates to tractor mounted implements and, more particularly, to an implement which requires a height adjustment for at least a part of the implement.

While this invention may be used with any type of tractor, it is disclosed herein for use primarily with a smaller garden tractor. Garden tractors like their larger counterparts commonly use a variety of implements and attachments to accomplish their various tasks. Some of these tasks require that the implement be adjustable with respect to the ground. This adjustability requirement has been accomplished in the prior art devices by a variety of methods which, for the most part, center on the use of a vertically extending, swingable handle or the like, connected to respective subassemblies consisting of a plurality of links, brackets, pivots, or other related pieces, in order to effect an upward or downward movement of a portion of the implement by a swinging motion of the handle. This method of adjustment presents a number of problems, one of which is the danger inherent in the use of an upwardly extending projection which may be in a position to inflict personal injury to the operator of the tractor during installation of the implement on the tractor, or during use thereof. In addition, a vertically extending handle may be a source of inconvenience to the operator of the implement by being in a position which would hinder the operator or otherwise interfere with the normal operation of the implement.

Another method of height adjustment depends upon relocation of wheels which requires a greater amount of time to complete than that required for the swingable handle and presents certain dangers of its own during the process of repositioning of the wheels.

None of the prior art devices, to the best of my knowledge, successfully uses a horizontally extending, swingable lever or handle as a part of a height adjustment. A horizontal handle is desirable because it eliminates the danger of an upwardly extending projection while not sacrificing the speed and convenience of a swingable handle. Even though a horizontally extending handle offers advantages not found in its vertical counterpart or in other prior art methods of height adjustment, there has been no effective method heretofore shown in the prior art to translate the horizontal swinging motion of a horizontally extending handle into an upward or downward movement of a portion of an implement.

Accordingly, it is an important object of my present invention to provide an implement for a garden tractor which may not only be quickly lowered or raised with respect to the ground but which may be so adjusted without the risk of injury to the operator while the adjustment takes place.

As a corollary to the above object, it is another important object of the instant invention to provide for safety and convenience through use of a novel toggle-type suspension system having three separate pivotal axes as a basis for permitting use of the aforementioned type of handle adjustment.

Another important object of the present invention is to provide for safety, ease of operation and positive action by use of effective and uncomplicated structure intermediate the horizontally extending handle and said system to quickly raise or lower one end of the implement at the will of the operator.

Figures 1, 6:
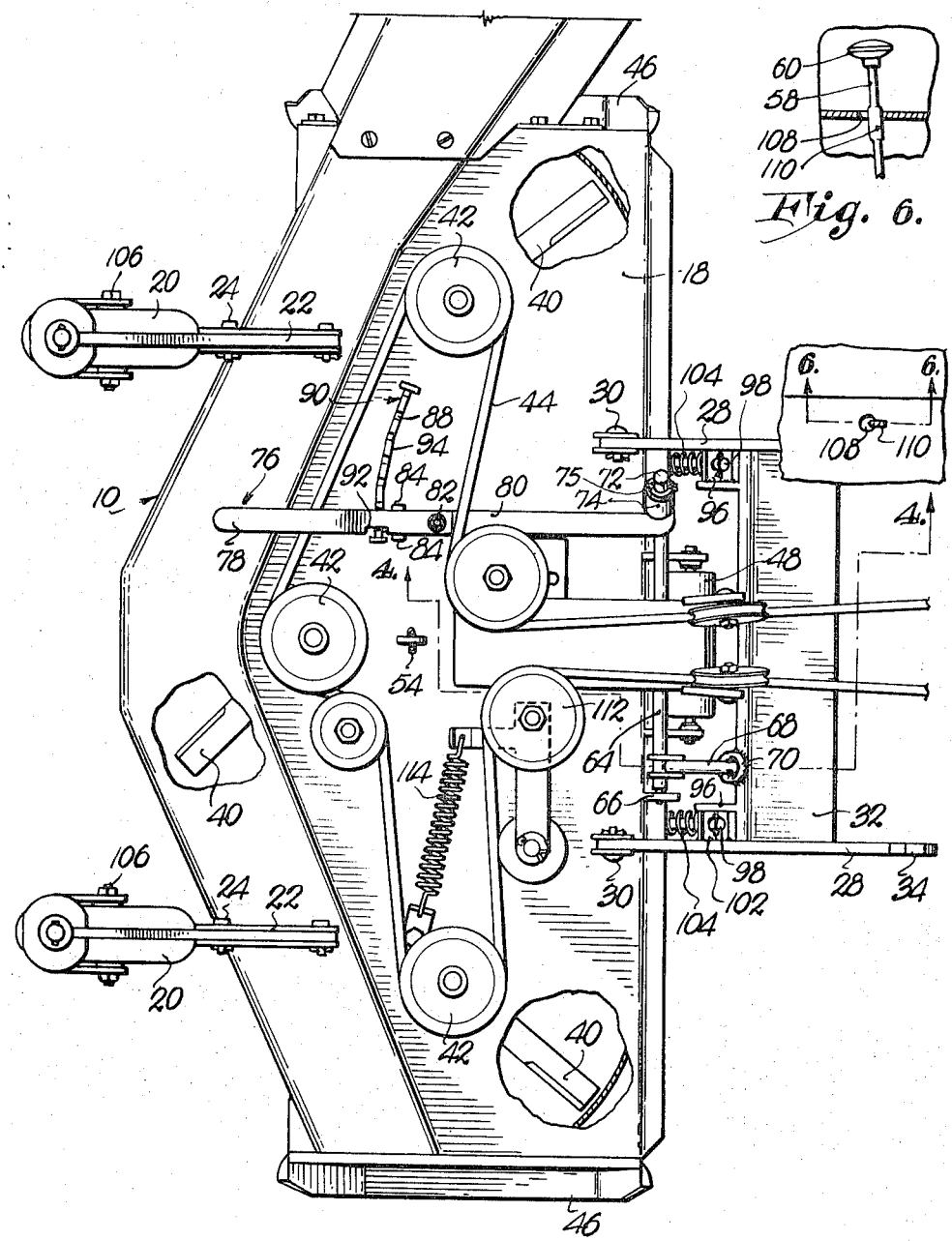
FIG. 1 is a top plan view of a mower implement embodying the principles of my present invention showing a portion of the tractor to which it is attached.
FIG. 6 is a fragmentary, detailed cross-sectional view taken on line 6—6 of FIG. 1.

An implement, such as a lawn mower attachment 10, is supported in part by wheels 12 of garden tractor 14 or other vehicle having an axle 16, and includes a body in the nature of a deck 18 supported by ground engaging structure such as caster wheels 20. Supporting bars 22 for wheels 20 are swingable vertically on deck 18 and held in adjusted positions by pins 24 in selected openings 26.

A hitch includes a pair of arms 28 having pivotal connections 30 with deck 18 and joined together by a crosshead 32. Arms 28 terminate in coupling hooks 34 engaging pins 36 spanning plates 38 depending from tractor 14.

Three cutter blades 40 or other tools beneath deck 18 are operably connected with corresponding pulleys 42 around which is trained a continuous belt 44 driven by the engine (not shown) of tractor 14. Skids 46 and a roller 48 carried by deck 18 below the cutting plane reduce scalping when uneven terrain is encountered. Attachment 10 may be raised, or lowered onto wheels 20, by a hydraulic piston and cylinder assembly 50 coupled with bell cranks 52 on tractor 14, deck 18 being suspended, when raised, from the cranks 52 by chains 54.

Hooks 34 are releasably held in place by lateral extensions 56 on rods 58 which terminate in knobs 60 accessible to the operator of the tractor 14. When rods 58 are lowered, the extensions 56 slide along slots 62 in plates 38 and along the forward edges of hooks 34 to hold the latter in place for swinging movement about pins 36.

Mechanism for raising and lowering the rear end of attachment 10 includes a horizontal shaft or rod member 64 along the rear edge of deck 18, restrained in any conventional manner against axial movement, but mounted for oscillation within brackets 66 extending rearwardly from deck 18. A radial crank pin 68 rigid to rod 64 at one end of the latter extends rearwardly therefrom through a loop 70 depending from crosshead 32, the loop 70 cooperating to restrain rod 64 against axial movement in addition to that provided by the aforementioned conventional means.

The opposite end 72 of torque rod 64 is in the nature of an integral projection that extends upwardly and outwardly at an angle less than 90° with respect to the axis of rod 64. A short tube 74 or similar device is mounted for oscillation on end 72 but held against axial movement by a pair of cotter pins 75 or the like. An elongated horizontal, manually operable handle element or lever 76 spaced above deck 18 and extending forwardly from tube 74 has a pair of sections 78 and 80 provided with a loose bolt connection 82, the rear end of section 80 being rigid to tube 74. Stops 84 on section 80 overlap section 78 to prevent relative swinging movement of sections 78 and 80 about connection 82, but section 78 may be raised slightly relative to section 80 between stops 84 and about connection 82 against the action of spring washer 86 on connection 82.

Section 78 is selectively received in any one of a number of notches 88 within an arcuate bar 90 rigid to deck 18 for releasably holding handle 76 against horizontal swinging movement toward and away from the fore and aft center line of attachment 10. A cutout 92 in the section 78 is received by teeth 94 of bar 90 (which define notches 88) to hold handle 76 against fore and aft movement along its longitudinal axis.

Figures 2, 3, 4, 5, 7:
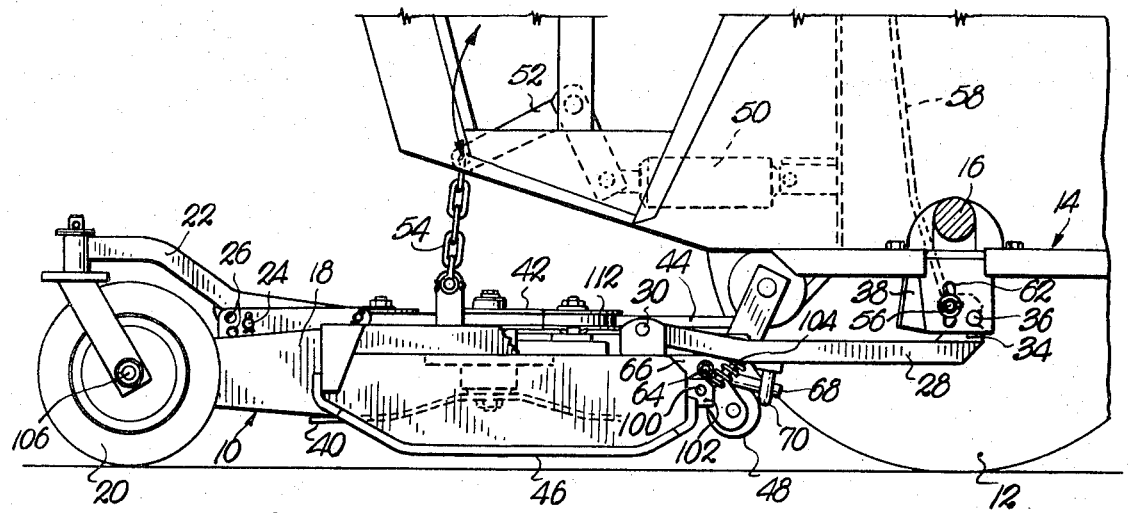
FIG. 2 is a side elevational view thereof.
FIG. 3 is an enlarged, fragmentary, rear elevational view of the implement itself, partially in section.
FIG. 4 is an enlarged cross-sectional view of FIG. 1 taken on irregular line 4—4.
FIG. 5 is a fragmentary, detailed cross-sectional view taken along line 5—5 of FIG. 4.
FIG. 7 is an enlarged view, similar in part to FIG. 4, illustrating portions of the control handle.

A downwardly offset, terminal end 95 of the section 80 of handle 76 projects beneath bar 90, as best seen in FIGS. 4 and 7. Tendency of the rod 64 to rotate causes handle 76 to tend to move in a plane perpendicular to the axis of rod 64, as well as the horizontal plane of its swinging movement. Thus, there must be containment in both planes and such is accomplished by notches 88 and end 95 of section 80. That is to say, because there is, in effect, presented a three dimensional linkage, with action in two planes, and since there is movement exerted in both planes during adjustment, the containment in both planes becomes necessary.

Each arm 28 has a gusset 96 that slidably receives a pin 98 which is in turn secured to a crossbolt 100 pivotally joining brackets 102 at the rearmost end of deck 18. Springs 104 coiled on pins 98 are interposed between gussets 96 and bolts 100.

OPERATION

Chains 54 are normally loose so that the wheels 20 will ride the terrain and cooperate with tractor 14 in supporting the attachment 10 at the height selected by adjustment of the handle 76 and the bars 22. Attachment 10 swings about pins 36 as wheels 20, skids 46 and roller 48 encounter rises and falls in the terrain. Depending on grass or weed conditions, it may be desirable only in rather rare instances to operate with attachment 10 carried by chains 54, holding wheels 20 elevated.

The back of the deck 18 is carried by the pin 68 engaged in loop 70 which is in turn carried by the tractor 14 through the push arms 28, pins 36 and plates 38. Inasmuch as the belt 44 extends forwardly a considerable distance ahead of the pins 36, the tension of the belt 44 during normal mowing operations tends to lift the back of the deck 18, restrained, of course, by pin 68 engaging the crosshead 32. Except for springs 104, variances in the load on belt 44 would cause up and down movement of the rear of deck 18 to the extent permitted by the looseness of the pin 68 in loop 70. This would result in uneven mowing.

Springs 104 act within a contained assembly which includes the pins 36 and the attachment 10 to tend to cause the control pin 68 to ride in the bottom of loop 70 rather than bounce up and down in loop 70 and vary the cutting height. All of the forces exerted by springs 104 remain within the assembly at any predetermined setting of the attitude position control handle 76.

Inasmuch as the tension of belt 44 is exerted ahead of the lift points of attachment 10, belt 44 tends to lift the attachment 10, thereby transferring the weight of the latter to the wheels 12. Such lifting tendency on the part of belt 44 is created by idler 112 for belt 44, held under tension by spring 114.

To raise or lower the rear of deck 18, it is but necessary to raise section 78 of handle 76 slightly about the connection 82, so as to release it from bar 90, swing handle 76 horizontally to a new position along bar 90, and then lower section 78 into another selected notch 88 between a pair of teeth 94. This swings end 72 of rod 64 fore or aft to turn the latter in brackets 66 and swing pin 68 up or down. Consequent raising or lowering of the rear of deck 18 is effected by virtue of a toggle-like action because simultaneous pivoting takes place about axles 106 of wheels 20, connections 30 of arms 28 and pins 36 of hooks 34 during swinging of handle 76.

Removal of attachment 10 from tractor 14 may be accomplished by removal of the belt 44 from the drive pulley (not shown) of tractor 14, disconnecting chains 54 and pulling upwardly on knobs 60 to raise rods 58 and their extensions 56 and clear hooks 34. Tractor 14 is then simply backed away to pull pins 36 out of hooks 34. When rods 58 are raised they may be pulled back in keyhole slots 108 to wedge flats 110 or rods 58 tightly in the narrow, elongated portions of slots 108 and hold the rods 58 elevated.

Extensions 56 are thus held clear of hooks 34 when the tractor is again moved forwardly to guide the plates 38 into alignment with the hooks 34 and reinsert the pins 36 into hooks 34. If the adjustments of bars 22 and handle 76 are such that the hooks 34 are too low to receive pins 36, blocks may be inserted under skids 46 or roller 48 to raise hooks 34 to the right height.

Attachment 10 may also be manually moved to a position where one hook 34 is inserted between a pair of plates 38 and looped over the corresponding pin 36, whereupon the proximal extension 56 is dropped into place. The procedure is then repeated with respect to the other hook 34. In any event, the springs 104 hold the arms 28 against undue downward movement about connections 30 during the coupling of the attachment 10 with the tractor 14.

Having thus described the invention, what is claimed as new and desired to be secured by Letters Patent is:

1. Motion transmitting structure comprising:
   an elongated shaft;
   means for supporting said shaft for oscillation about its longitudinal axis and holding the same against axial movement;
   an elongated, lever irrotational about its longitudinal axis extending laterally from the shaft and swingable within a plane substantially parallel therewith; and
   a coupling for oscillating said shaft about said axis during swinging of said lever within said plane, said coupling including a lateral projection on the shaft swingable about said axis of the shaft during oscillation of the latter and a device rigid to the lever and rotatable on the projection.

2. Structure as claimed in claim 1, wherein said axis and said plane are horizontally disposed and said projection extends upwardly and outwardly from one end of the shaft.

3. Structure as claimed in claim 2, wherein said device is a tube and means is provided to hold the tube against axial movement along the projection.

4. Structure as claimed in claim 1, there being an angle between said axis and the projection of less than 90°.

5. Structure as claimed in claim 1, and a member disposed for engagement with the lever for holding the latter in said plane during swinging of the lever.

6. Structure as claimed in claim 5, wherein said member is disposed for free reciprocation of the lever along its longitudinal axis during swinging of the lever.

7. Structure as claimed in claim 1; and latching means for releasably holding the lever in any one of a number of selected positions along its path of swinging travel.

8. Structure as claimed in claim 7, wherein said latching means has associated therewith a member for holding the lever in said plane during swinging of the lever.

9. Structure as claimed in claim 8, wherein said lever has a pair of yieldably interconnected sections, one of which is disposed for retention by said member and the other of which is biased toward said latching means for releasable retention thereby.

10. Structure as claimed in claim 1, wherein is provided a crank on said shaft and a component for receiving torque from said shaft through said crank.

* * * * *